(12) United States Patent
Shimazaki

(10) Patent No.: US 11,334,748 B2
(45) Date of Patent: May 17, 2022

(54) INFORMATION PROCESSING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventor: Hiroshi Shimazaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 778 days.

(21) Appl. No.: 15/969,851

(22) Filed: May 3, 2018

(65) Prior Publication Data

US 2018/0336406 A1 Nov. 22, 2018

(30) Foreign Application Priority Data

May 17, 2017 (JP) .............................. JP2017-098030

(51) Int. Cl.
| | | |
|---|---|---|
| *G06K 9/00* | (2022.01) | |
| *G06F 3/06* | (2006.01) | |
| *G06N 7/00* | (2006.01) | |
| *G06N 20/00* | (2019.01) | |
| *G06F 16/16* | (2019.01) | |
| *G06F 15/76* | (2006.01) | |
| *G06F 16/93* | (2019.01) | |
| *G06F 17/00* | (2019.01) | |

(52) U.S. Cl.
CPC ....... *G06K 9/00469* (2013.01); *G06F 3/0652* (2013.01); *G06F 15/76* (2013.01); *G06F 16/164* (2019.01); *G06F 16/93* (2019.01); *G06K 9/00456* (2013.01); *G06N 7/005* (2013.01); *G06N 20/00* (2019.01)

(58) Field of Classification Search
CPC ............ G06K 9/00469; G06K 9/00456; G06F 15/76; G06F 16/93; G06F 16/164; G06F 3/0652; G06F 17/22; G06F 17/30012; G06F 15/18; G06N 20/00; G06N 7/005
See application file for complete search history.

(56) References Cited

U.S. PATENT DOCUMENTS

2007/0156745 A1* 7/2007 Harrington ........... G06F 40/131
2007/0206215 A1* 9/2007 Iwase ................... G06F 3/1241
  358/1.15

(Continued)

FOREIGN PATENT DOCUMENTS

| JP | H04-47366 A | 2/1992 |
|---|---|---|
| JP | 2007-193574 A | 8/2007 |

(Continued)

OTHER PUBLICATIONS

Jun. 22, 2021 Office Action issued in Japanese Patent Application No. 2017-098030.

(Continued)

*Primary Examiner* — Quoc A Tran
(74) *Attorney, Agent, or Firm* — Oliff PLC

(57) ABSTRACT

An information processing apparatus includes a manager that manages documents stored in a memory together with history information including version information indicating a history of revision, a receiver that receives extraction criteria selected from the history information, and an extractor that extracts the documents from the memory based on the received extraction criteria.

7 Claims, 12 Drawing Sheets

(56) References Cited

U.S. PATENT DOCUMENTS

| | | | | |
|---|---|---|---|---|
| 2008/0134023 A1* | 6/2008 | Aizawa | ............... | G06F 16/93 |
| | | | | 715/255 |
| 2010/0011032 A1* | 1/2010 | Fukuoka | ............. | G06F 16/10 |
| | | | | 707/E17.01 |
| 2014/0201148 A1* | 7/2014 | Doui | ............ | G06F 16/93 |
| | | | | 707/638 |
| 2017/0200122 A1* | 7/2017 | Edson | ............... | H04L 63/104 |
| 2018/0285326 A1* | 10/2018 | Goyal | ............... | G06F 40/166 |

FOREIGN PATENT DOCUMENTS

| | | |
|---|---|---|
| JP | 2013-191177 A | 9/2013 |
| JP | 2016-006633 A | 1/2016 |

OTHER PUBLICATIONS

Feb. 8, 2022 Office Action issued in Japanese Patent Application No. 2017-098030.

* cited by examiner

FIG. 2

| PATIENT ID | DOCUMENT ID | DOCUMENT TYPE CODE | DOCUMENT NAME (VERSION NUMBER) | MEDICAL DIVISION CODE | DELETION FLAG | |
|---|---|---|---|---|---|---|
| FXPAT001 | 1000001 | DOC01001 | DESCRIPTIONS OF VARIOUS TREATMENTS_1 | 1101 | 0 | |
| FXPAT001 | 1000001 | DOC01001 | DESCRIPTIONS OF VARIOUS TREATMENTS_2 | 1101 | 1 | |
| FXPAT001 | 1000002 | DOC01002 | INTERVIEW SHEET_1 | 1103 | 0 | |
| FXPAT001 | 1000003 | DOC01003 | SURGICAL CONSENT FORM_1 | 1105 | 0 | ... |

DOWNLOAD OF DOCUMENTS FOR MEDICAL RECORD DISCLOSURE
SPECIFY CRITERIA FOR DOCUMENTS TO BE DISCLOSED.

830 — DATE RANGE
FROM: 07062016
TO: 07102016          830a

831 — DIVISION TO REQUEST: ALL DIVISIONS (50)    [SELECT DIVISION TO REQUEST] — 831a

832 — DOCUMENT TYPE: ALL DOCUMENT TYPES (1000)   [SELECT DOCUMENT TYPE] — 832a

833 — OPTIONS
APPROVAL:  ⊙ APPROVED ITEMS ONLY    ○ INCLUDE UNAPPROVED ITEMS
VERSIONS:  ⊙ LATEST VERSIONS ONLY    ○ ALL VERSIONS
DELETED DOCUMENTS:  ⊙ NOT DOWNLOAD    ○ DOWNLOAD

834 — ORDER OF DOCUMENTS         834a
SORT KEY:  [NONE ▼]

835 — [EDIT COMMENT]  NO COMMENTS ENTERED.

[DOWNLOAD]  [CANCEL]
   836        837

83

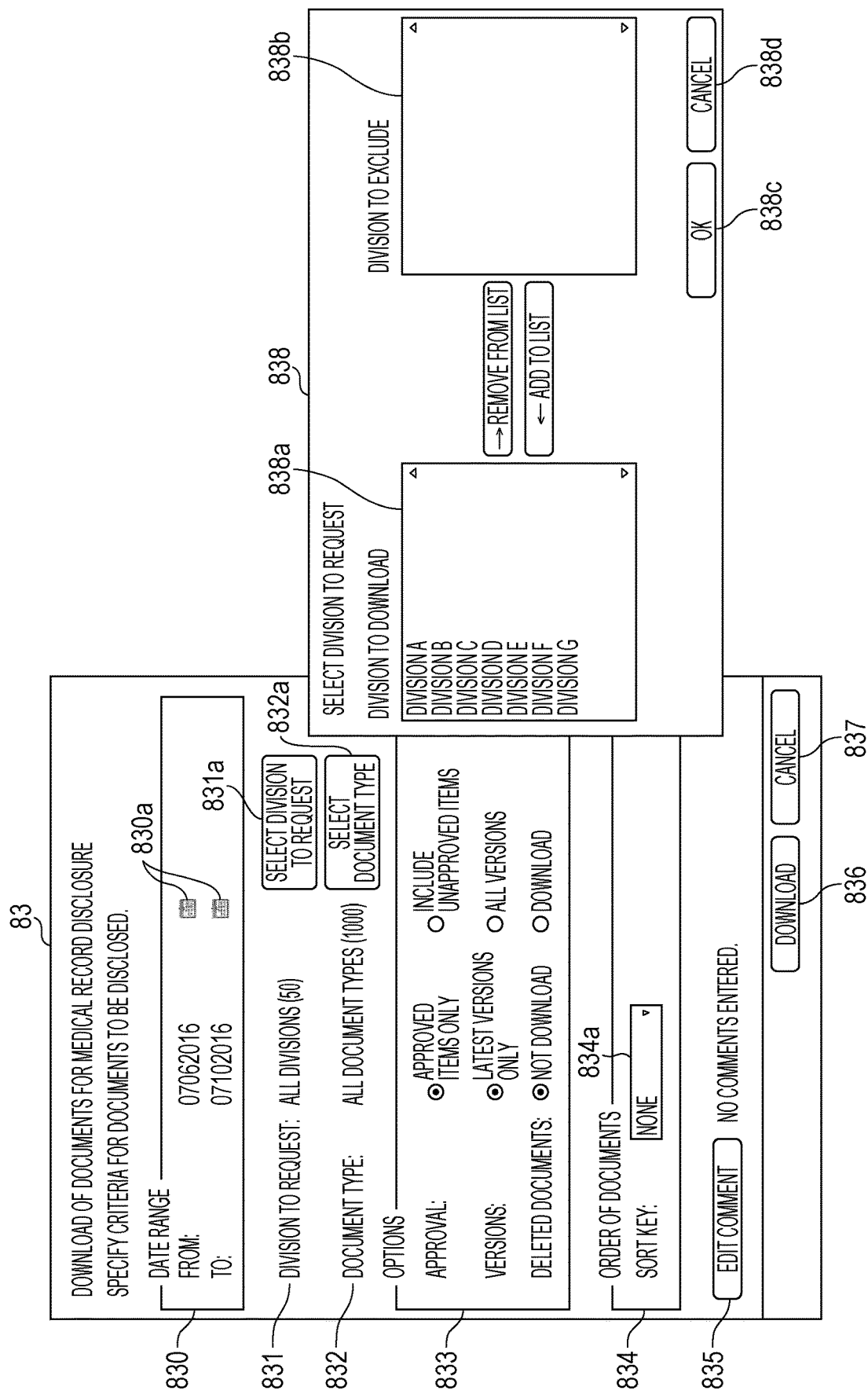

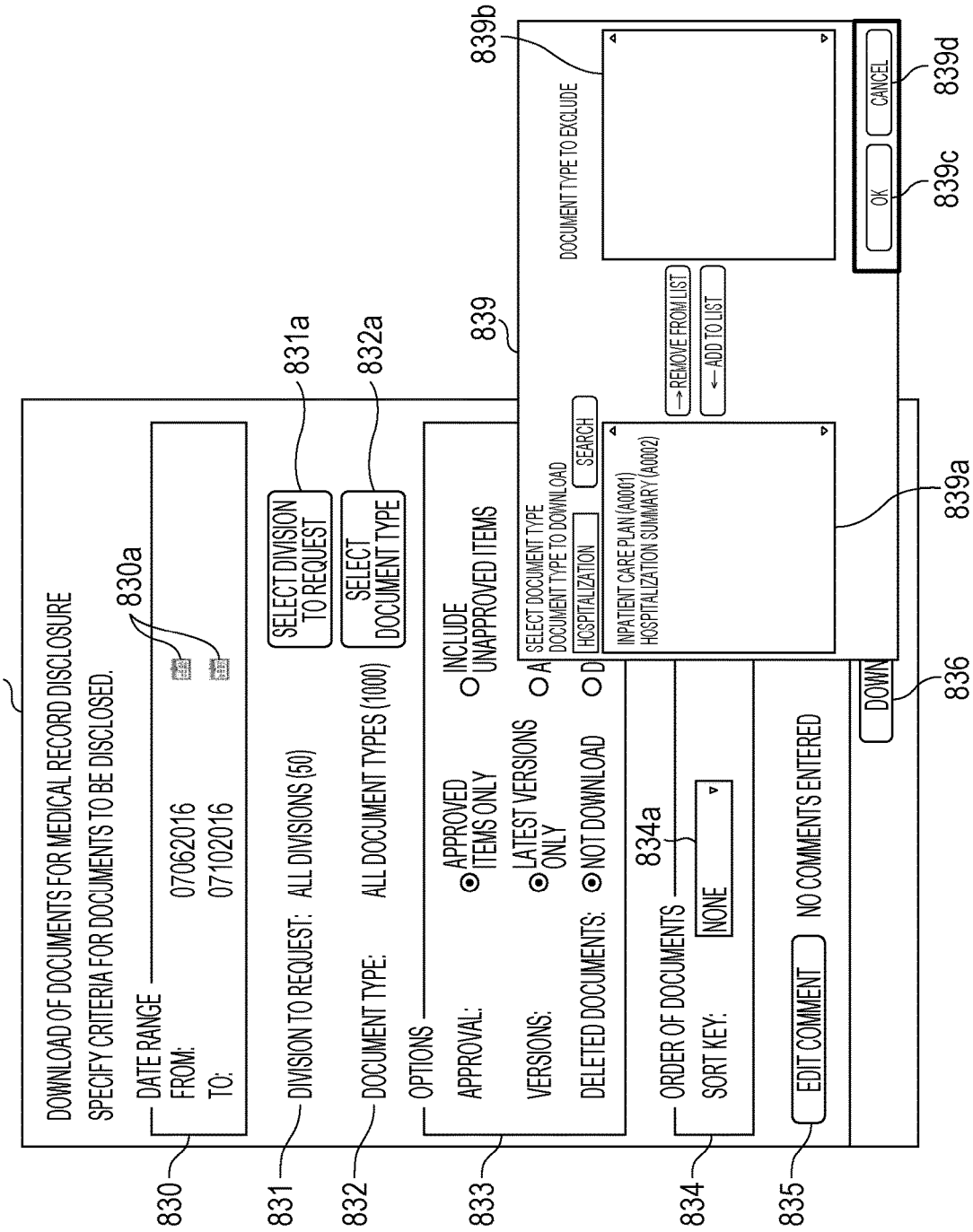

FIG. 5D

DOWNLOAD OF DOCUMENTS FOR MEDICAL RECORD DISCLOSURE
SPECIFY CRITERIA FOR DOCUMENTS TO BE DISCLOSED.

DATE RANGE
FROM: 07062016
TO: 07102016

DIVISION TO REQUEST: ALL DIVISIONS (50)  [SELECT DIVISION TO REQUEST]

DOCUMENT TYPE: ALL DOCUMENT TYPES (1000)  [SELECT DOCUMENT TYPE]

OPTIONS
APPROVAL: ⦿ APPROVED ITEMS ONLY  ◯ INCLUDE UNAPPROVED ITEMS
VERSIONS: ⦿ LATEST VERSIONS ONLY  ◯ ALL VERSIONS
DELETED DOCUMENTS: ⦿ NOT DOWNLOAD  ◯ DOWNLOAD

ORDER OF DOCUMENTS
SORT KEY:

| NONE |
| DOCUMENT TYPE CODE (ASCENDING ORDER) |
| DOCUMENT TYPE CODE (DESCENDING ORDER) |
| MEDICAL DIVISION CODE (ASCENDING ORDER) |
| MEDICAL DIVISION CODE (DESCENDING ORDER) |
| EVENT END DATE (ASCENDING ORDER) |
| EVENT END DATE (DESCENDING ORDER) |

[EDIT COMMENT]

[DOWNLOAD]  [CANCEL]

DATE OF OPERATION: 01-13-2017 10:04:19
OPERATOR: DAVID ANDERSON

PATIENT NAME: JOHN SMITH
PATIENT ID: FXPAT001

DOWNLOAD CRITERIA
DATE RANGE (START DATE): 06012016
DATE RANGE (END DATE): 12162016

NUMBER OF ITEMS DOWNLOADED: 14

MEDICAL DIVISIONS EXCLUDED
NONE

DOCUMENT TYPES EXCLUDED
CONSENT FORM ON CENTRAL VENOUS CATHETER (DOC01037)
COMMENTS ON HEALTH INSURANCE CLAIM (FOR DISUSE SYNDROME) (DOC02801)

OPTIONS
APPROVAL: APPROVED ITEMS ONLY
VERSIONS: LATEST VERSIONS ONLY
DELETED DOCUMENTS: EXCLUDED

ORDER OF DOCUMENTS
FIRST SORT KEY: MEDICAL DIVISION CODE (ASCENDING ORDER)
SECOND SORT KEY: EVENT END DATE (DESCENDING ORDER)
THIRD SORT KEY: NONE

COMMENT
CLINICAL RECORDS ARE DOWNLOADED BASED ON DETAILS OF REQUEST.
```

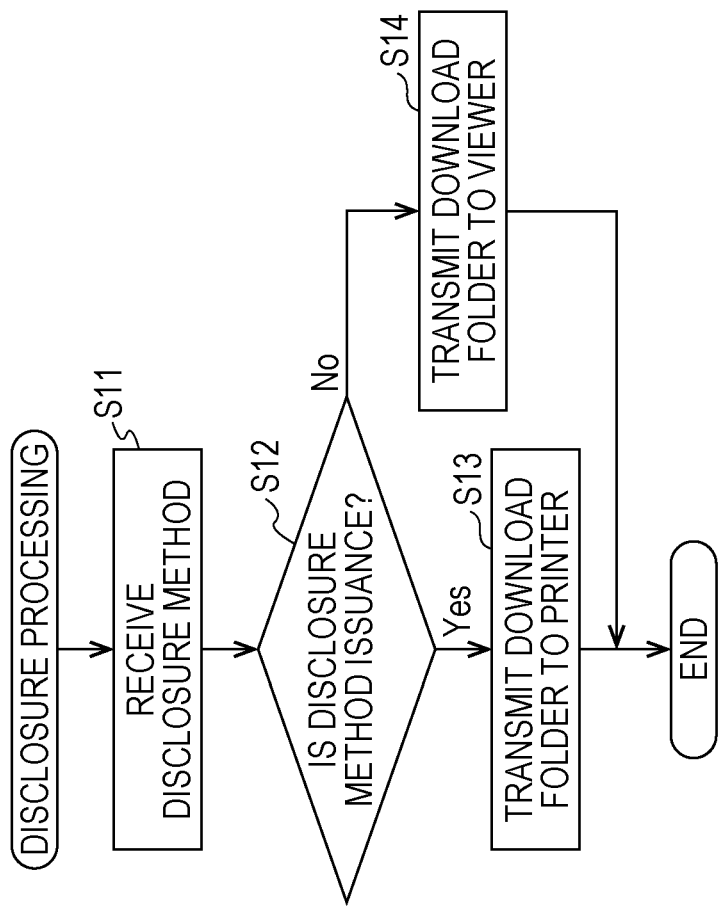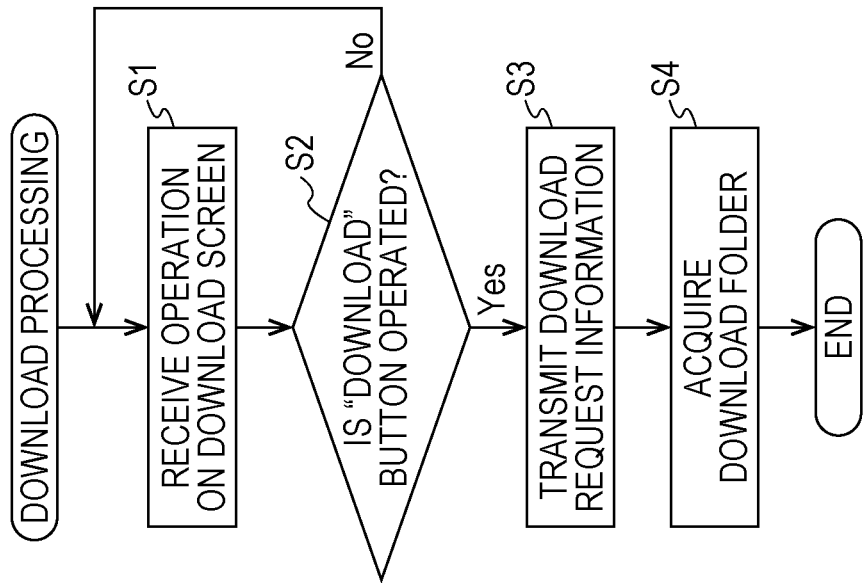

# INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-098030 filed May 17, 2017.

BACKGROUND

Technical Field

The present invention relates to an information processing apparatus and a non-transitory computer readable medium storing a program.

SUMMARY

According to an aspect of the invention, there is provided an information processing apparatus including:

a manager that manages documents stored in a memory together with history information including version information indicating a history of revision;

a receiver that receives extraction criteria selected from the history information; and an extractor that extracts the documents from the memory based on the received extraction criteria.

BRIEF DESCRIPTION OF THE DRAWINGS

An exemplary embodiment of the present invention will be described in detail based on the following figures, wherein:

FIG. 2 illustrates an example of a document management table stored in a storage unit of a server apparatus;

FIG. 4 illustrates an example of a tree view screen;

FIG. 5A illustrates an example of an initial screen of a download screen;

FIG. 5B illustrates an example of a window for specifying divisions to request in the download screen;

FIG. 5C illustrates an example of a window for specifying document types in the download screen;

FIG. 5D illustrates an example of a pull-down menu for specifying the order of documents in the download screen;

FIG. 6 illustrates an example of a download summary;

FIG. 7A and FIG. 7B are flowcharts illustrating examples of an operation of a client apparatus, in which FIG. 7A illustrates download processing and FIG. 7B illustrates disclosure processing.

DETAILED DESCRIPTION

Figure 1:
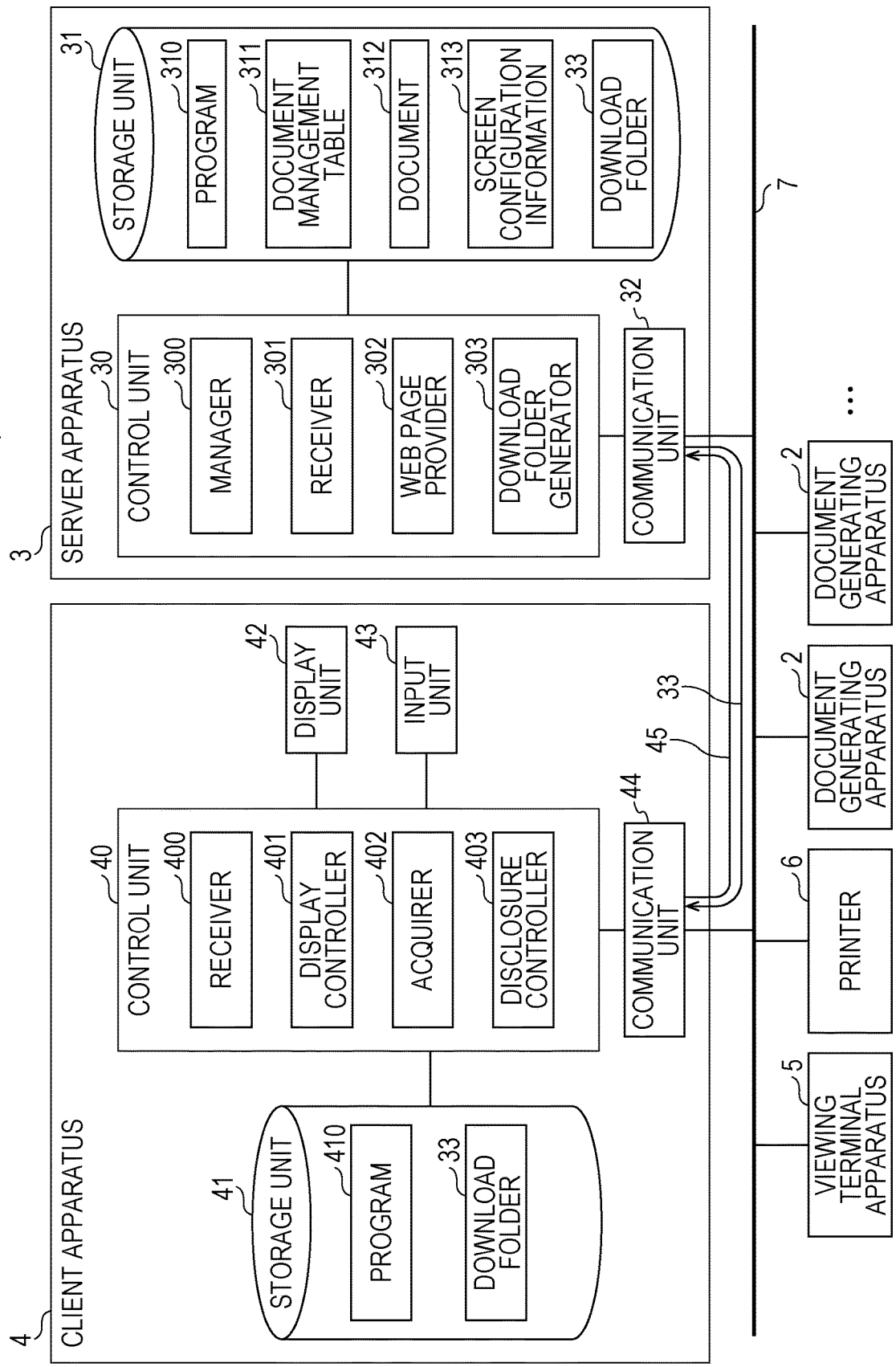
FIG. 1 is a block diagram illustrating an example of a control system of an information processing system according to the exemplary embodiment of the present invention.

An exemplary embodiment of the present invention is described below with reference to the drawings. In the drawings, constituent elements having substantially the same functions are denoted by the same reference symbols and description thereof is not repeated.

Summary of Exemplary Embodiment

An information processing apparatus according to the exemplary embodiment of the present invention includes a manager that manages documents stored in a memory together with history information including version information indicating a history of revision, a receiver that receives extraction criteria selected from the history information, and an extractor that extracts the documents from the memory based on the received extraction criteria.

The "document" stored in the memory includes an electronic document generated by scanning a paper document, and an electronic document created by using an application. The "document" may also include images such as a photograph and an illustration. The "history information" is information on a history of revision, deletion, and the like that are performed after the document is stored in the memory. For example, the "history information" includes version information indicating a history of revision of a document, and deletion instruction information indicating an instruction to delete a document.

Exemplary Embodiment

FIG. 1 is a block diagram illustrating an example of a control system of an information processing system according to the exemplary embodiment of the present invention. An information processing system 1 includes plural document generating apparatuses 2 that generate documents converted into an electronic format, a server apparatus 3 that integrally manages various documents generated by the document generating apparatuses 2, a client apparatus 4 that extracts documents from the server apparatus 3 according to intended uses, a viewing terminal apparatus 5 to be used for viewing the extracted documents on a screen, and a printer 6 that outputs the extracted documents by printing. The server apparatus 3 is an example of the information processing apparatus or an external apparatus. The client apparatus 4 is an example of the information processing apparatus. Each of the client apparatus 4, the viewing terminal apparatus 5, and the printer 6 is an example of an output part.

The document generating apparatuses 2, the server apparatus 3, the client apparatus 4, the viewing terminal apparatus 5, and the printer 6 are connected to each other via a network 7 such as the Internet or a local area network (LAN). In FIG. 1, one client apparatus 4, one viewing terminal apparatus 5, and one printer 6 are connected to the network 7, but two or more client apparatuses 4, two or more viewing terminal apparatuses 5, and two or more printers 6 may be connected to the network 7.

The document generating apparatus 2 includes a scanner to be used for converting a paper document into an electronic format, a display unit such as a liquid crystal display, an input unit such as a keyboard and a mouse, a control unit that creates an electronic document by using an application, and a communication unit connected to the network 7. For example, the document generating apparatuses 2 are provided in various departments (such as a reception desk, a consulting room, an examination room, a medical office, and a ward) in a medical institution. For example, documents serving as clinical information are generated and stored in the server apparatus 3.

The document generating apparatus 2 transmits the generated documents to the server apparatus 3 together with attribute information and history information. Examples of the documents generated by the document generating apparatus 2 include descriptions of various treatments, consent forms such as a surgical consent form, planning documents such as an inpatient care plan, records such as a surgical record and an anesthesia record, interview sheets, and referral forms from other hospitals.

The server apparatus 3 has a function of managing documents, and a function of causing the printer 6 to print documents by simply placing a print job in a shared folder without intervention of a printer driver. In the print job, print conditions and documents to be printed are described by a page description language (PDL). Examples of the print conditions include the number of copies, setting of color or monochrome printing, a print paper size, setting of single-sided or double-sided printing, and a print order. The print job is an example of print instruction information.

The client apparatus 4 is, for example, operated by an operator who belongs to the medical institution. In response to a request for disclosure of documents, the client apparatus 4 extracts the documents from the server apparatus 3 and discloses the documents to the requesting person. The person who operates the client apparatus 4 is not limited to the operator who belongs to the medical institution. The client apparatus 4 may have a printing function or a printer may directly be connected to the client apparatus 4 by wire or wirelessly.

Documents are disclosed by a method such as viewing, issuance, or verbal explanation. When documents are disclosed by viewing, the client apparatus 4 outputs the documents to the viewing terminal apparatus 5. When documents are disclosed by issuance, the client apparatus 4 causes the printer 6 to print the documents, thereby issuing the documents to the requesting person. Documents may be issued by an electromagnetic method that involves storing the documents in a recording medium such as a CD-ROM or a USB memory. When the client apparatus 4 has a printing function, documents may be printed by a printing unit provided in the client apparatus 4. When a printer is directly connected to the client apparatus 4, documents may be printed by the printer.

The viewing terminal apparatus 5 is, for example, operated by a requesting person who requests disclosure of documents or by a representative for a requesting person. For example, a personal computer (PC) including a display unit such as a liquid crystal display, an input unit such as a keyboard and a mouse, and a communication unit connected to the network 7 may be used as the viewing terminal apparatus 5. The person who operates the viewing terminal apparatus 5 is not limited to the requesting person or the representative.

For example, the printer 6 outputs documents by printing the documents on recording media such as paper by an electrophotographic system or an ink jet system. The printer 6 has a function of printing documents in accordance with a print job transmitted from the server apparatus 3 or the client apparatus 4.

Configuration of Server Apparatus

The server apparatus 3 includes a control unit 30, a storage unit 31, and a communication unit 32. The storage unit 31 is an example of the memory.

The control unit 30 is configured by a central processing unit (CPU), an interface, and the like. The CPU functions as a manager 300, a receiver 301, a web page provider 302, a download folder generator 303, and the like by operating in accordance with a program 310. Details of the units 300 to 303 are described later. The download folder generator 303 is an example of the extractor and a generator.

The storage unit 31 is configured by a read only memory (ROM), a random access memory (RAM), a hard disk drive, and the like. The storage unit 31 stores the program 310, a document management table 311 (see FIG. 2), documents 312, screen configuration information 313 necessary for the screen configuration of a web page, a download folder 33, and the like. Examples of the documents stored in the storage unit 31 include an electronic document generated by scanning a paper document, and an electronic document created by using an application.

The communication unit 32 is implemented by, for example, a network interface card (NIC) and communicates with an external apparatus via the network 7.

When a document is transmitted from the document generating apparatus 2 together with attribute information and history information, the manager 300 generates a document ID and records a patient ID, the document ID, the history information, the attribute information, and the like in the document management table 311. The term "record" is herein used when information is written in a table and the term "store" is herein used when information is written in a storage unit. Examples of the history information include version information such as a version number indicating a history of revision of a document, and deletion instruction information indicating an instruction to delete a document. Examples of the attribute information include a document type indicating the type of a document, and a medical division where a document is created. Details of the document management table 311 are described later.

The manager 300 manages the documents stored in the storage unit 31 based on management information including the attribute information and the history information of the documents. When an instruction is made so as to delete any one of the documents stored in the storage unit 31, "1" is recorded in a "DELETION FLAG" field of the document management table 311. This document 312 is stored in the storage unit 31 without being deleted. That is, this document 312 is not physically deleted but logically deleted. The deletion instruction is not limited to the instruction that is made on a document basis. For example, the deletion instruction may be made on a page, chapter, paragraph, sentence, or character basis in a document. In this case, the document is logically deleted on the page, chapter, paragraph, sentence, or character basis. That is, when a document is downloaded as described later, it may be specified that the download is performed not only on the document basis but also on the page, chapter, paragraph, sentence, or character basis in the document.

The receiver 301 receives download request information 45 transmitted from the client apparatus 4. The download request information 45 includes information for requesting download and specifying items to be downloaded. The download request information 45 includes a patient ID for identifying a patient, document extraction criteria, output order information indicating an output order of documents (such as serial numbers or document order information indicating the order of documents), and the like. The patient is an example of a specific person.

The web page provider 302 provides web pages to the client apparatus 4 via the network 7 and causes a display unit 42 to display the web pages. Examples of the web pages provided by the web page provider 302 include a login screen, a patient selection screen, a matrix view screen (see FIG. 3), a tree view screen (see FIG. 4), and a download screen (see FIG. 5A to FIG. 5E).

The download folder generator 303 generates the download folder 33 based on the download request information 45 transmitted from the client apparatus 4 and on the document management table 311. When the generation of the download folder 33 is completed, the download folder generator 303 transmits information indicating the completion of download folder generation to the client apparatus 4. The download folder 33 is an example of the output part.

Specifically, based on the download request information 45 and the document management table 311, the download folder generator 303 extracts applicable documents from the storage unit 31 and creates a download summary and a download document list. The download folder generator 303 generates the download folder 33 in which the extracted document files, the created download summary, and the created download document list are collectively compressed into a single folder in a ZIP format or the like. The download summary is an example of a summary that summarizes the extraction criteria.

The download folder generator 303 generates a folder name of the download folder 33 and also generates file names of the document files in accordance with a file naming convention.

For example, the folder name of the download folder 33 is represented by "{MMDDYYYY}_{HHMMSS}_{patient ID}_{patient name}_disclosure purpose.zip". The formats "MMDDYYYY" and "HHMMSS" represent a date and time when the download folder 33 is generated. For example, when the download folder 33 is generated at 17:11:26 on Jan. 16, 2017, the patient ID is "FXPAT001", and the patient name is "John Smith", the folder name of the download folder 33 is represented by "01162017_171126_FXPAT001_John Smith_disclosure purpose.zip".

For example, the document file is named in accordance with a file naming convention represented by "{sequence number}_{document title}_{first sort key}_{second sort key}_{third sort key}_{version number}_{file format}".

The sequence number is a four-digit number that starts from "0001" and is generated in accordance with the order of documents that is specified on a download screen 83 described later. The sequence number indicates an output order of documents. That is, the sequence number indicates a display order of documents acquired by download and also indicates a print order of the documents. Each of the sequence number, the first sort key, the second sort key, and the third sort key is an example of the output order information indicating the output order of documents (such as the display order and the print order).

The version number indicates a version of a document and is updated every time the document is revised. The version number is an example of the version information indicating a history of revision of a document. Examples of the file format include "pdf" and "xdw".

Configuration of Client Apparatus

The client apparatus 4 includes a control unit 40, a storage unit 41, the display unit 42, an input unit 43, and a communication unit 44.

The control unit 40 is configured by a central processing unit (CPU), an interface, and the like. The CPU functions as a receiver 400, a display controller 401, an acquirer 402, a disclosure controller 403, and the like by operating in accordance with a program 410. Details of the units 400 to 403 are described later. The program 410 includes a web browser to be used for viewing web pages.

The storage unit 41 is configured by a read only memory (ROM), a random access memory (RAM), a hard disk drive, and the like. The storage unit 41 stores the program 410, the download folder 33, and the like. The download folder 33 is generated and stored in the storage unit 41 for each patient ID.

The display unit 42 is implemented by, for example, a liquid crystal display. The input unit 43 is implemented by, for example, a keyboard and a mouse.

The display controller 401 controls the display unit 42 to display various screens. Examples of the screens displayed on the display unit 42 include a login screen, a patient selection screen, a matrix view screen, a tree view screen, and a download screen. Details of each screen are described later.

The communication unit 44 is implemented by, for example, a network interface card (NIC) and communicates with the server apparatus 3 via the network 7.

The receiver 400 receives information specified or input by operating the input unit 43 on the screen displayed on the display unit 42.

The display controller 401 controls the display unit 42 to display a screen provided from the web page provider 302 of the server apparatus 3 and also performs display control based on an operation performed on the screen displayed on the display unit 42.

When a "DOWNLOAD" button 836 is operated on the download screen 83, the acquirer 402 generates the download request information 45 based on information received by the receiver 400 through the operation performed on the download screen 83. The acquirer 402 transmits the download request information 45 to the server apparatus 3 and acquires the download folder 33 from the server apparatus 3. The acquirer 402 stores the acquired download folder 33 in the storage unit 41.

The disclosure controller 403 discloses, to a requesting person, the download folder 33 that is downloaded by a disclosure method specified by the requesting person. When issuance is specified as the disclosure method, the disclosure controller 403 reads the download folder 33 from the storage unit 41, decompresses the download folder 33, and places the document files included in the decompressed download folder (document files, download summary, and download document list) in the shared folder of the server apparatus 3 as a single print job (including print conditions and items to be printed). The print conditions include details of instructions to print the document files, the download summary, and the download document list in this order and to print the document files in the order of the sequence numbers of the file names. The print job placed in the shared folder of the server apparatus 3 is transmitted to the printer 6 to execute printing. By executing the printing of the document files in the single print job, plural document files may be printed continuously without interruption during the printing.

When viewing is specified as the disclosure method, the disclosure controller 403 decompresses the download folder 33 that is read from the storage unit 41, transmits the decompressed download folder (document files, download summary, and download document list) to the viewing terminal apparatus 5, and causes the display unit to display the transmitted documents in the order of the document files, the download summary, and the download document list and to display the document files in the order of the sequence numbers of the file names. The download folder output to each of the printer 6 and the viewing terminal apparatus 5 is an example of the output part.

FIG. 2 illustrates an example of the document management table 311 stored in the storage unit 31 of the server apparatus 3. The document management table 311 includes patient IDs for identifying patients. Management information on documents generated for the patients is recorded in the document management table 311. FIG. 2 illustrates a table information part including data whose patient ID is "FXPAT001". The management information recorded in the document management table 311 includes attribute information and history information. The document management table 311 is provided with various items such as a "PATIENT ID" field where patients are identified, a "DOCUMENT ID" field where document IDs for identifying documents are recorded, a "DOCUMENT TYPE CODE" field where document type codes indicating the types of the documents are recorded, a "DOCUMENT NAME (VERSION NUMBER)" field where document names that are titles of the documents are recorded together with version numbers, a "MEDICAL DIVISION CODE" field where medical division codes indicating medical divisions where the documents are created are recorded, and the "DELETION FLAG" field where "1" is recorded when an instruction is made so as to delete any one of the documents. Even if the document is revised and the version number is changed, the same document ID is used without being changed. The version number is suffixed to the document name. A version number "_1" suffixed to the document name indicates "Version 1" and a version number "_2" indicates "Version 2". The items of the document management table 311 are not limited to those illustrated in FIG. 2. In the document management table 311 of this exemplary embodiment, the medical division is used as an attribute of the medical institution, but any item indicating an attribute of, for example, a facility, a department, a place, a hospital, a company, or a group may be employed instead. The medical division is an example of information indicating a source where the document is created.

Configuration of Matrix View Screen

Figure 3:
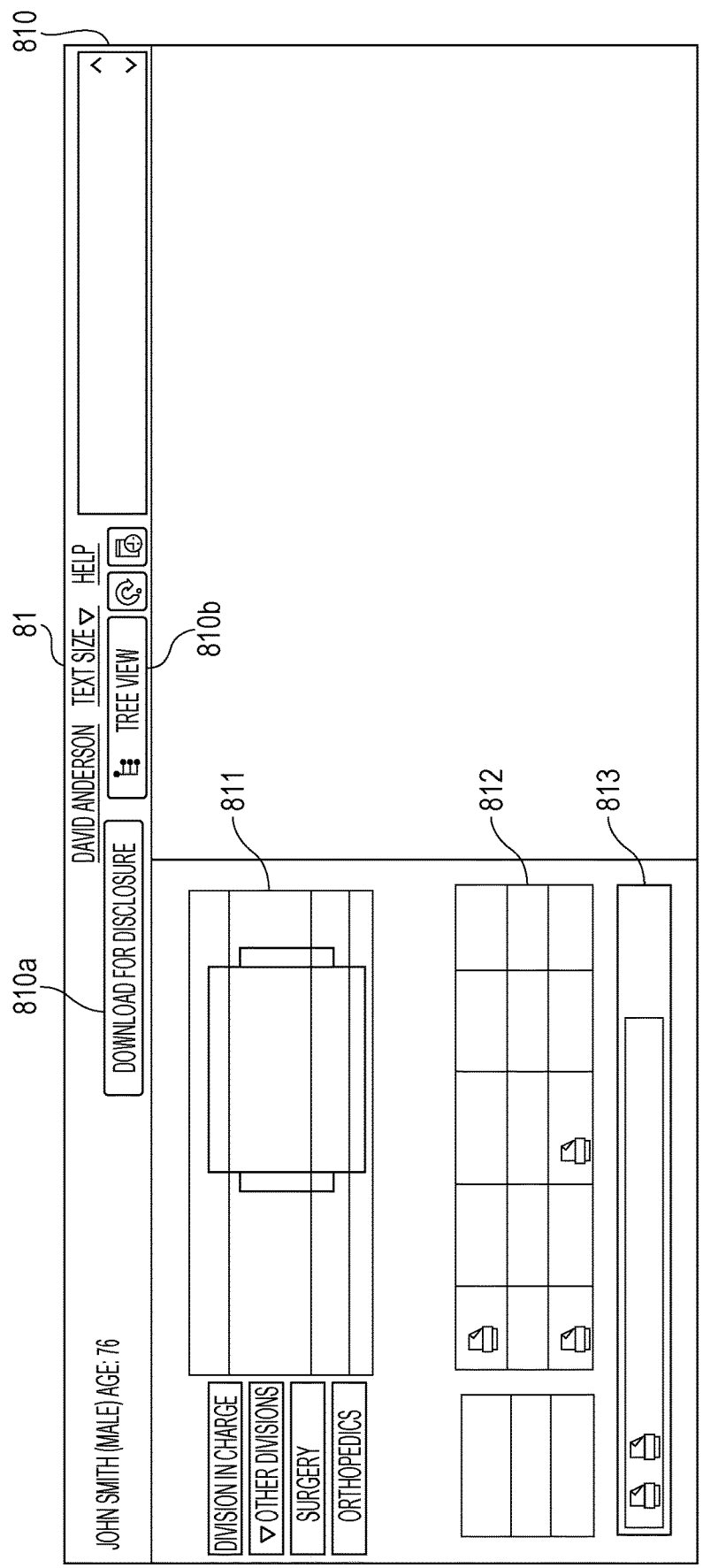
FIG. 3 illustrates an example of a matrix view screen.

FIG. 3 illustrates an example of the matrix view screen. A matrix view screen 81 is configured so that events associated with documents may be viewed along a time axis. For example, the events are any clinical activities such as outpatient care, surgery, examination, and hospitalization, in which records are kept as documents. As illustrated in FIG. 3, the matrix view screen 81 has a common display area 810, a timeline display area 811, a registered document display area 812, and an operation palette area 813.

The common display area 810 is an area where information common to the matrix view and the tree view is displayed. The common display area 810 is provided with a "DOWNLOAD FOR DISCLOSURE" button 810a for displaying the download screen 83, and a "TREE VIEW" button 810b for displaying a tree view screen 82. When the "DOWNLOAD FOR DISCLOSURE" button 810a is operated, the download screen 83 is displayed on the display unit 42. When the "TREE VIEW" button 810b is operated, the tree view screen 82 is displayed on the display unit 42.

The timeline display area 811 is an area where document icons are arranged on the time axis. The display range of the registered document display area is changeable by resizing or moving a display time frame.

The registered document display area 812 is an area where registered documents in the display time frame are displayed in different colors based on the types of the documents.

In the matrix view screen 81, logically deleted documents are not displayed. The logically deleted documents may be viewed on the tree view screen 82.

The operation palette area 813 is an area to be used for temporarily listing documents to be operated. The operation palette area 813 is used by adding the documents into the operation palette area 813 from the registered document display area 812 by a drag and drop gesture.

Configuration of Tree View Screen

FIG. 4 illustrates an example of the tree view screen. The tree view screen 82 is a screen to be used for retrieving and viewing target documents. The tree view screen 82 has a common display area 820, a category folder area 821, a document list area 822, and a preview display area 823.

The common display area 820 is an area where information common to the matrix view and the tree view is displayed. The common display area 820 is provided with a "DOWNLOAD FOR DISCLOSURE" button 820a for displaying the download screen 83, and a "MATRIX VIEW" button 820b for displaying the matrix view screen 81. When the "DOWNLOAD FOR DISCLOSURE" button 820a is operated, the download screen 83 is displayed on the display unit 42. When the "MATRIX VIEW" button 820b is operated, the matrix view screen 81 is displayed on the display unit 42.

The category folder area 821 is an area that indicates how the documents are categorized. The documents are categorized on criteria such as dates and types of the documents and are displayed in the form of folders.

The document list area 822 is an area where a list of documents is displayed and a selection is made from the list. A list of documents that meet the criterion selected in the category folder area 821 is displayed. A deleted document 822a is also displayed in the document list area 822. The deleted document 822a is struck through to indicate that the document has been deleted. When the deleted document 822a is selected in the document list area 822, a deleted document 824 is displayed on the right side of the preview display area 823 as a document preview.

In the tree view screen 82, a document that is not authorized to view and a logically deleted document are also displayed in the document list. When the selected document is in a status in which deletion is requested, a document preview is displayed alone without displaying deletion request information.

The preview display area 823 is an area where an image of a document is displayed. An image of a document selected in the document list area 822 is displayed.

Configuration of Download Screen

Figure 5E:
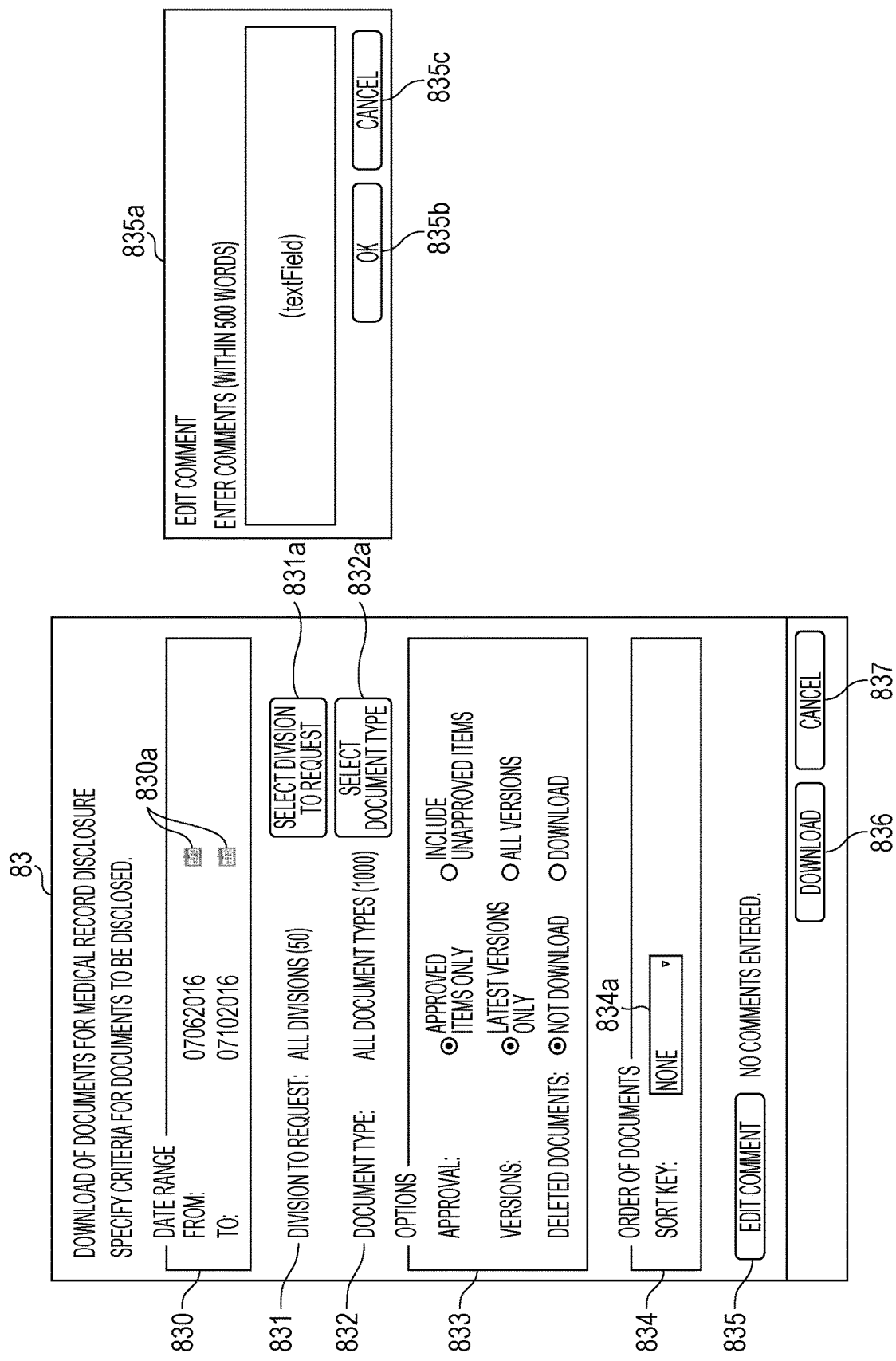
FIG. 5E illustrates an example of a window for editing comments in the download screen.

FIG. 5A to FIG. 5E illustrate examples of the download screen. FIG. 5A illustrates an example of an initial screen of the download screen. FIG. 5B illustrates an example of a window for specifying divisions to request in the download screen. FIG. 5C illustrates an example of a window for specifying document types in the download screen. FIG. 5D illustrates an example of a pull-down menu for specifying the order of documents in the download screen. FIG. 5E illustrates an example of a window for editing comments in the download screen.

The download screen 83 is used for downloading documents to be disclosed. The download screen 83 is displayed as a dialogue box when the "DOWNLOAD FOR DISCLOSURE" button 810a of the matrix view screen 81 illustrated in FIG. 3 or the "DOWNLOAD FOR DISCLOSURE" button 820a of the tree view screen 82 illustrated in FIG. 4 is operated. When a "CANCEL" button 837 of the download screen 83 is operated, the download screen 83 is closed and the screen is returned to the original matrix view screen 81 or the original tree view screen 82.

As illustrated in FIG. 5A, the download screen 83 is provided with a date range input area 830, a division-to-request specifying area 831, a document type specifying area 832, an option area 833, a document order area 834, an "EDIT COMMENT" button 835, the "DOWNLOAD" button 836, and the "CANCEL" button 837. Items specified in the date range input area 830, the division-to-request specifying area 831, the document type specifying area 832, and the option area 833 are examples of the extraction criteria to be used for extracting documents.

The date range input area 830 is used for specifying a date range from a start date to an end date for download. The default value (initial value) is a date range that covers all the documents displayed in the document list area 822 of the tree view screen 82 illustrated in FIG. 4. The default value of the start date is the earliest event end date of all the event end dates of the documents. The default value of the end date is the latest event end date of all the event end dates of the documents. When a calendar icon 830a is clicked, a calendar is displayed and the date may be selected from the calendar.

When any division is specified as a target of extraction in the division-to-request specifying area 831, a "SELECT DIVISION TO REQUEST" button 831a is operated. When no division is specified, all the divisions are set as targets of extraction. The item "ALL DIVISIONS (50)" illustrated in FIG. 5A indicates that 50 divisions are present as targets of extraction. When the "SELECT DIVISION TO REQUEST" button 831a is operated, a window 838 for specifying divisions to request is opened as illustrated in FIG. 5B. In the window 838 for specifying divisions to request, a left area 838a is an area where target divisions are input and a right area 838b is an area where divisions to be excluded from the targets are input. When an "OK" button 838c is operated in the window 838 for specifying divisions to request, the specifying of divisions to request is confirmed. When a "CANCEL" button 838d is operated, the specifying of divisions to request is canceled. The division to request is a division where a patient has been treated when a document is created. For example, the division to request is a medical division. Therefore, the documents include a document created in a different division where the patient has visited for reception, examination, or the like.

When any document type is specified as a target of extraction in the document type specifying area 832, a "SELECT DOCUMENT TYPE" button 832a is operated. When no document type is specified, all the document types are set as targets of extraction. The item "ALL DOCUMENT TYPES (1000)" illustrated in FIG. 5A indicates that 1000 document types are present as targets of extraction. When the "SELECT DOCUMENT TYPE" button 832a is operated, a window 839 for specifying document types is opened as illustrated in FIG. 5C. In the window 839 for specifying document types, a left area 839a is an area where target document types are input and a right area 839b is an area where document types to be excluded from the targets are input. When an "OK" button 839c is operated in the window 839 for specifying document types, the specifying of document types is confirmed. When a "CANCEL" button 839d is operated, the specifying of document types is canceled.

In the option area 833, items regarding approval, versions, and deleted documents may be specified by selecting radio buttons associated with the items. Regarding the approval, it may be specified whether only the approved items are set as targets of extraction or unapproved items are included in the targets of extraction. Regarding the versions, it may be specified whether only the latest versions are set as targets of extraction or all the versions are set as the targets of extraction. Regarding the deleted documents, it may be specified whether the deleted documents are downloaded or not. Regarding the approval, the default value indicates only the approved items. Regarding the versions, the default value indicates only the latest versions. Regarding the deleted documents, the default value indicates exclusion of the deleted documents.

In the document order area 834, three sort keys 834a (referred to also as a first sort key, a second sort key, and a third sort key in the order from the left) may be specified as sort keys. Before the operation, the first sort key 834a is displayed alone. When the first sort key 834a is operated, a pull-down menu 834b appears as illustrated in FIG. 5D. Item keys indicating "NONE", "DOCUMENT TYPE CODE (ASCENDING ORDER)", "DOCUMENT TYPE CODE (DESCENDING ORDER)", "MEDICAL DIVISION CODE (ASCENDING ORDER)", "MEDICAL DIVISION CODE (DESCENDING ORDER)", "EVENT END DATE (ASCENDING ORDER)", and "EVENT END DATE (DESCENDING ORDER)" are displayed in the pull-down menu 834b and any one of the item keys may be selected. A pull-down menu 834b for the second sort key appears on the download screen 83 when a condition other than "NONE" is specified as the first sort key. Similarly, a pull-down menu 834b for the third sort key appears on the download screen 83 when a condition other than "NONE" is specified as the second sort key.

When none of the three sort keys is specified, three predetermined sort keys are employed. For example, the first sort key is "DOCUMENT TYPE CODE (ASCENDING ORDER)", the second sort key is "MEDICAL DIVISION CODE (ASCENDING ORDER)", and the third sort key is "EVENT END DATE (ASCENDING ORDER)". The same item keys cannot be specified in the respective sort keys 834a. The item keys indicating "DOCUMENT TYPE CODE (ASCENDING ORDER)", "DOCUMENT TYPE CODE (DESCENDING ORDER)", "MEDICAL DIVISION CODE (ASCENDING ORDER)", "MEDICAL DIVISION CODE (DESCENDING ORDER)", "EVENT END DATE (ASCENDING ORDER)", and "EVENT END DATE (DESCENDING ORDER)" are examples of the document order information. The document order information is not limited thereto and may further include other item keys. The event end date is a date of a record that is kept after an event (clinical activity). Examples of the record include an initial visit record, a surgical record, and a follow-up record.

When the "EDIT COMMENT" button 835 is operated, a window 835a for editing comments is displayed as illustrated in FIG. 5E and a comment may be input and edited. When the comment input to a comment input field is fine, an "OK" button 835b is operated to confirm the comment. When a "CANCEL" button 835c is operated, the comment is canceled.

FIG. 6 illustrates an example of the download summary. A download summary 84 includes a date of download operation, an operator name, a patient name, a patient ID, the number of downloaded items, excluded medical divisions, excluded document types, specified items regarding the approval, the versions, and the deleted documents in the options, the order of documents, and a comment. The excluded medical divisions and the excluded document types are examples of information on excluded documents.

Operation of Information Processing System

Next, an example of an operation of the information processing system 1 is described with reference to the flowcharts of FIG. 7A, FIG. 7B, and FIG. 8. The following description of the operation is directed to a case in which the information processing system 1 integrally manages plural departments (systems) in a medical institution. It is assumed that a patient "John Smith" whose patient ID is "FXPAT001" has requested document disclosure by submitting a written request for disclosure in a department where the client apparatus 4 is installed. In the written request for disclosure, the patient name, the purpose of disclosure, the disclosure method, and the like are written.

(1) Operation of Client Apparatus

FIG. 7A and FIG. 7B are flowcharts illustrating examples of an operation of the client apparatus 4. FIG. 7A illustrates download processing and FIG. 7B illustrates disclosure processing. The examples of the operation of the client apparatus 4 are described with reference to the flowcharts of FIG. 7A and FIG. 7B in different sections: (a) preparation processing, (b) download processing, and (c) disclosure processing.

(a) Preparation Processing

When the client apparatus 4 is activated, the display controller 401 requests the server apparatus 3 to display a login screen. The web page provider 302 of the server apparatus 3 generates the login screen based on the screen configuration information 313 and provides the login screen to the client apparatus 4. The display controller 401 of the client apparatus 4 controls the display unit 42 to display the login screen.

The operator inputs a user ID associated with his/her name (for example, "David Anderson") and a password by operating the input unit 43 on the login screen. The display controller 401 of the client apparatus 4 transmits the input user ID and password to the server apparatus 3. The web page provider 302 verifies the transmitted user ID and password against authentication information stored in the storage unit 31. When the authentication is successful, the web page provider 302 generates a patient selection screen based on the screen configuration information 313 and provides the patient selection screen to the client apparatus 4. The display controller 401 of the client apparatus 4 controls the display unit 42 to display the patient selection screen.

The operator inputs a medical division and the patient ID on the patient selection screen. The medical division is a medical division where the patient has been treated. The display controller 401 transmits the input medical division and patient ID to the server apparatus 3. Based on the screen configuration information 313, the web page provider 302 generates the matrix view screen 81 illustrated in FIG. 3 that is associated with the transmitted medical division and patient ID and provides the matrix view screen 81 to the client apparatus 4. The display controller 401 controls the display unit 42 to display the matrix view screen 81.

When the operator operates the "DOWNLOAD FOR DISCLOSURE" button 810a of the matrix view screen 81 by operating the input unit 43, the web page provider 302 generates the download screen 83 illustrated in FIG. 5A based on the screen configuration information 313 and provides the download screen 83 to the client apparatus 4. The display controller 401 controls the display unit 42 to display the download screen 83.

When the operator operates the "TREE VIEW" button 810b of the matrix view screen 81 by operating the input unit 43, the web page provider 302 generates the tree view screen 82 illustrated in FIG. 4 based on the screen configuration information 313 and provides the tree view screen 82 to the client apparatus 4. The display controller 401 controls the display unit 42 to display the tree view screen 82. When the "DOWNLOAD FOR DISCLOSURE" button 820a of the tree view screen 82 is operated, the web page provider 302 provides the download screen 83 illustrated in FIG. 5A to the client apparatus 4. The display controller 401 controls the display unit 42 to display the download screen 83. When the "MATRIX VIEW" button 820b of the tree view screen 82 is operated, the matrix view screen 81 is displayed on the display unit 42.

(b) Download Processing

The receiver 400 receives an operation performed by the operator on the download screen 83 illustrated in FIG. 5A (S1). Specifically, it is assumed that the operator performs the following operation. In the date range input area 830, the operator inputs a start date of Jun. 1, 2016 and an end date of Dec. 16, 2016 as a date range for download. In the division-to-request specifying area 831, the operator selects all the divisions. In in the document type specifying area 832, the operator specifies document types as targets of extraction by operating the "SELECT DOCUMENT TYPE" button 832a. In the option area 833, the operator specifies only the approved items, only the latest versions, and exclusion of the deleted documents. In the document order area 834, the operator selects the first sort key as "MEDICAL DIVISION CODE (ASCENDING ORDER)", the second sort key as "EVENT END DATE (DESCENDING ORDER)", and the third sort key as "NONE". The operator inputs a comment as "CLINICAL RECORDS ARE DOWNLOADED BASED ON DETAILS OF REQUEST." by operating the "EDIT COMMENT" button 835.

When the operator operates the "DOWNLOAD" button 836 (S2: Yes), the acquirer 402 generates the download request information 45 based on the operation performed on the download screen 83 and transmits the download request information 45 to the server apparatus 3 (S3). Based on the download request information 45 and the document management table 311, the download folder generator 303 generates the download folder 33 obtained by compressing files in a ZIP format or the like.

The download folder generator 303 extracts applicable documents from the documents 312 stored in the storage unit 31, generates a folder name of the download folder 33, and also generates file names of the document files. For example, the download folder generator 303 generates the folder name of the download folder 33 as represented by "01162017_171126_FXPAT001_John Smith_disclosure purpose.zip". For example, the download folder generator 303 generates the file names of the document files in accordance with a rule represented by "{sequence number}_{document title}_{medical division code (ascending order)}_{event end date (descending order)}_{version number}_{file format}". For example, the file name of a first document file is "0001_descriptions of various treatments_internal medicine_12-24-2016_1_.xdw".

When the generation of the download folder 33 is completed, the download folder generator 303 transmits information indicating the completion of download folder generation to the client apparatus 4. The display unit 42 of the client apparatus 4 displays an indication that the download processing is completed.

The download folder generator 303 transmits the download folder 33 to the client apparatus 4. The acquirer 402 of the client apparatus 4 acquires the download folder 33 and stores the download folder 33 in the storage unit 41. Thus, the download processing is terminated.

(c) Disclosure Processing

The operator inputs the disclosure method that is written in the written request for disclosure by operating the input unit 43. The receiver 400 of the client apparatus 4 receives the input disclosure method (S11).

The disclosure controller 403 determines whether the disclosure method received by the receiver 400 is issuance (S12). When the disclosure method is issuance (S12: Yes), the disclosure controller 403 reads the download folder 33 from the storage unit 41, decompresses the download folder 33, and places the files included in the decompressed download folder in the shared folder of the server apparatus 3 as a single print job. The control unit 30 of the server apparatus 3 outputs the print job to the printer 6. Based on the print conditions included in the print job, the printer 6 prints the document files, the download summary, and the download document list in this order and prints the document files in the order of the sequence numbers of the file names. The printed documents are issued to the requesting person.

In Step S12, when the disclosure method is not issuance (S12: No), that is, when the disclosure method is viewing, the disclosure controller 403 reads the download folder 33 from the storage unit 41, decompresses the download folder 33, and transmits the decompressed download folder to the viewing terminal apparatus 5. The viewing terminal apparatus 5 causes the display unit to display the document files, the download summary, and the download document list in this order and to display the document files in the order of the sequence numbers of the file names. Thus, the patient is allowed to view the document files, the download summary, and the download document list.

(2) Operation of Server Apparatus

Figure 8:
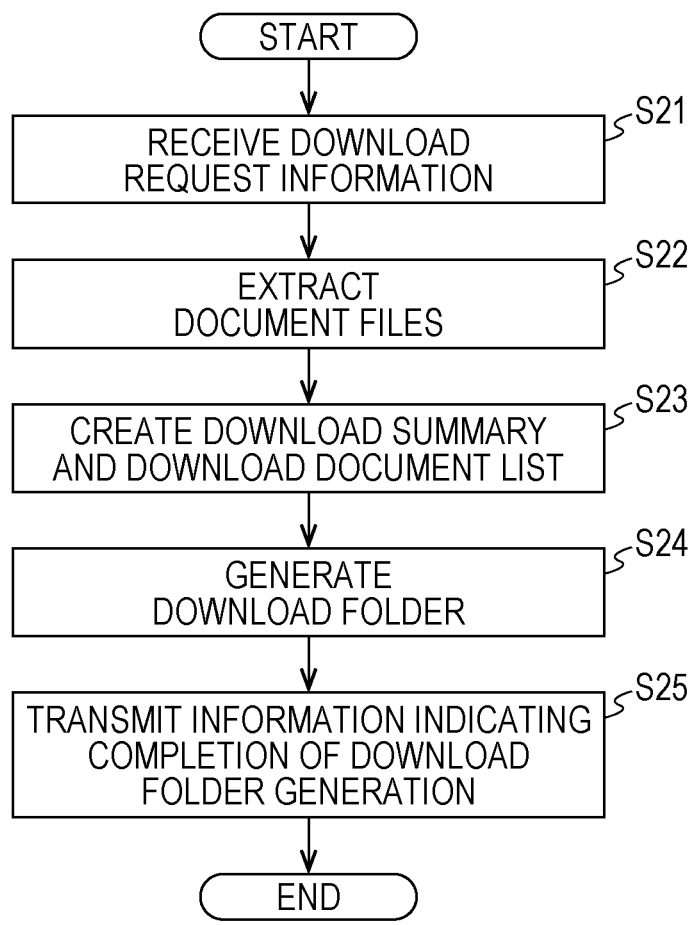
FIG. 8 is a flowchart illustrating an example of an operation of the server apparatus.

FIG. 8 is a flowchart illustrating an example of an operation of the server apparatus 3. The example of the operation of the server apparatus 3 is described with reference to the flowchart of FIG. 8.

When the receiver 301 of the server apparatus 3 receives the download request information 45 from the client apparatus 4 (S21), the download folder generator 303 extracts documents from the storage unit 31 based on the download request information 45 and the document management table 311 (S22). The download folder generator 303 creates a download summary and a download document list based on the extracted documents (S23) and generates the download folder 33 (S24). When the generation of the download folder 33 is completed, the download folder generator 303 transmits information indicating the completion of download folder generation to the client apparatus 4 (S25).

Other Exemplary Embodiments

Although the exemplary embodiment of the present invention is described above, the exemplary embodiment of the present invention is not limited to the exemplary embodiment described above and various modifications and exemplary embodiments may be adopted.

When the documents are output in an order in which the details of the documents are easy to understand, the following configurations may be adopted.

[1] An information processing apparatus, including:
a manager that manages documents stored in a memory together with attribute information thereof; and
a generator that generates, when the documents are output to an output part (for example, a ZIP folder, a folder, a recording medium, or an external apparatus such as a printer), output order information indicating an output order of the documents based on the attribute information.

[2] The information processing apparatus according to Configuration [1],
in which the output order information at least includes information indicating types of the documents (for example, document type codes), information indicating sources where the documents are created (for example, medical division codes), and document order information indicating an order of the documents within a date range of end dates (for example, event end dates) of events that have occurred to a specific person (for example, a patient) written in the documents, and
in which the generator generates the output order information by sorting that uses the document order information.

[3] The information processing apparatus according to Configuration [1], in which the generator generates file names of the documents by using the output order information.

[4] The information processing apparatus according to Configuration [3], in which the output order information includes sequence numbers.

[5] The information processing apparatus according to Configuration [3], in which the file names of the documents include document titles.

The above description is directed to the case in which the information processing system according to the exemplary embodiment of the present invention is applied to the medical institution. The information processing system according to the exemplary embodiment of the present invention may be applied to a system installed in an office, a facility such as a school, or a shop as long as the documents are stored in the storage unit and the stored documents are extracted and output to the outside.

The client apparatus may partly or entirely have the functions of the server apparatus 3. For example, in this exemplary embodiment, the server apparatus 3 generates the file names of the document files when generating the download folder. The client apparatus 4 may generate the file names including the output order information indicating the output order of the documents when outputting the download folder to the output part (such as the viewing terminal apparatus 5 or the printer 6).

In the exemplary embodiment described above, the output order information is included in the file names. The output order information may be linked to the file names to control the output order of the documents.

In the exemplary embodiment described above, the documents are output to the viewing terminal apparatus 5 or the printer 6. The documents may be output in the form of a recording medium such as a CD-ROM or a USB memory.

As the information processing apparatus, the client apparatus 4 may have the functions of the server apparatus 3. Specifically, the client apparatus 4 may store the documents in the storage unit. In response to the request, the client apparatus 4 may extract the documents from the storage unit, generate the folder names including the output order information, and output the document files to the output part (such as a ZIP folder, a folder, the viewing terminal apparatus 5, or the printer 6) or output a folder including the document files to the external apparatus (such as the viewing terminal apparatus 5 or the printer 6).

Each of the control units 30 and 40 may partly or entirely be configured by a hardware circuit such as a field programmable gate array (FPGA) or an application specific integrated circuit (ASIC).

The constituent elements of the exemplary embodiment described above may partly be omitted or changed. For example, the viewing terminal apparatus 5 may be omitted when the display unit 42 of the client apparatus 4 is also used for viewing.

In the flows of the exemplary embodiment described above, steps may be added, deleted, changed, or switched in the order. The programs used in the exemplary embodiment described above may be provided by being recorded in computer readable recording media such as CD-ROMs. Alternatively, the programs used in the exemplary embodiment described above may be stored in an external server such as a cloud server and used via a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
   a manager that manages documents stored in a memory together with history information including version information indicating a history of revision, the history information including a deletion flag indicating an instruction to logically delete an entire document stored in the memory that does not physically delete the document, such that the document continues to be stored in the memory;
   a receiver that receives extraction criteria selected from the history information;
   an extractor that extracts the documents from the memory based on the received extraction criteria; and
   a display that displays the deletion flag in association with the document.

2. The information processing apparatus according to claim 1, wherein
   the extraction criteria include a date range of end dates of events that have occurred to a specific person written in the documents.

3. The information processing apparatus according to claim 2, wherein
   the extraction criteria further include information indicating sources where the documents are created, and information indicating types of the documents.

4. The information processing apparatus according to claim 1, further comprising
   a generator that generates file names of the extracted documents so that the file names include output order information indicating an output order corresponding to a display order or a print order of the documents.

5. The information processing apparatus according to claim 4, wherein
   the generator generates a summary that summarizes the extraction criteria.

6. The information processing apparatus according to claim 5, wherein
   when the extraction criteria indicate that the deleted document is excluded, the summary includes information on the excluded document.

7. A non-transitory computer readable medium storing a program causing a computer, which includes a memory that stores documents, to execute a process comprising:
   managing the documents together with history information including version information indicating a history of revision, the history information including a deletion flag indicating an instruction to logically delete an entire document stored in the memory that does not physically delete the document, such that the document continues to be stored in the memory;
   receiving extraction criteria selected from the history information;
   extracting the documents from the memory based on the received extraction criteria; and
   instructing a display to display the deletion flag in association with the document.

* * * * *